United States Patent [19]

Claus

[11] 3,751,167

[45] Aug. 7, 1973

[54] METHOD AND APPARATUS FOR CONTINUOUS MONITORING OF DISSOLVED ORGANICS

[76] Inventor: George Claus, 130 Sundance Road, Stamford, Conn. 06905

[22] Filed: Feb. 23, 1971

[21] Appl. No.: 118,059

[52] U.S. Cl.................. 356/51, 250/43.5, 250/218, 356/181, 356/246, 424/2
[51] Int. Cl....................... G01n 21/26, G01n 21/34
[58] Field of Search...................... 356/51, 223, 246, 356/181; 250/43.5, 218; 424/2

[56] References Cited
UNITED STATES PATENTS
3,345,910  10/1967  Rosin................................. 356/246
2,923,823  2/1960   Forrester et al. ................. 356/51 X
3,582,659  6/1971   Dekkar.............................. 356/223

OTHER PUBLICATIONS
Mrkva, Journal of the Water Pollution Control Fed, vol. 41, no. 11, Nov. 1969, part 1, pp. 1,923-1,931.

Friedberg, Anacytical Letters, 1 (6) March 1968, pp. 399-400.

Primary Examiner—Ronald L. Wibert
Assistant Examiner—R. J. Webster
Attorney—Leonard H. King

[57] ABSTRACT

The amount of dissolved organic material in a solvent medium is measured by passing light radiation of 280 millimicron wavelength through the medium. The amino acid Tyrosine within the medium absorbs radiation of this wavelength. By measuring the absorbence of the radiation, the concentration of Tyrosine is determined and the amount of organic material can be calculated by the known proportional relationship of Tyrosine to total organic matter.

16 Claims, 2 Drawing Figures

PATENTED AUG 7 1973　　3,751,167

INVENTOR.
George Claus
BY
Leonard H. King
ATTORNEY

METHOD AND APPARATUS FOR CONTINUOUS MONITORING OF DISSOLVED ORGANICS

BACKGROUND OF THE INVENTION

This invention relates to the measurement of dissolved organic material in water and more particularly to the measurement of the absorption of the amino acid Tyrosine using spectrophotometric measurement.

The organic content of natural waters and also of solvent waste products is a useful indicator for establishing the degree of pollution contained in the water. The currently employed standard method for quantizing the total organic matter of water is based upon the determination of the oxidizable carbon content of the water. This procedure requires a lengthy digestion with chromic acid in a reflux system and a back titration of the residual acid. Chlorides and chlorines interfere with the process and additional steps have to be taken in order to eliminate this interference. As a result, this method is both costly and time consuming.

There are devices known for determining the organic content of water which employ instruments that automatically perform the required steps of the standard methods. However, such instruments use a distinct test sample of the water and are not available for continuous monitoring of the dissolved organic matter. A further method which is used for measuring the organic content involves a colorimetric instrument which measures the ultra-violet absorbence of the total organic carbon dissolved in water. Such an instrument is described in U.S. Pat. No. 3,535,044, issued to H. H. Seward on Oct. 20, 1970.

The Seward colorimeter uses a broad spectrum of light covering the entire ultra-violet range and must therefore compare the measurement of the test sample with a reference measurement.

It is therefore an object of this invention to provide a simple, convenient and reliable instrument for the continuous measurement of the dissolved organic content of water.

A further object is to describe an instrument which can provide a direct readout on a continuous basis of the total dissolved organic content of any particular solvent medium being measured.

Yet a further object of this invention is to provide an instrument which gives an indication of the pollutional levels of a solvent medium.

Yet another object of this invention is to provide an instrument for measuring dissolved organic matter in a solvent medium by using spectrophotometric measurement.

A further object of this invention is to provide an instrument which measures the absorption peak of the amino acid Tyrosine.

A still further object of this invention is to provide an instrument for measuring the total organic content of water using light radiation having a wave length in the range of 280 millimicra.

Yet a further object of this invention is to provide an instrument which measures the organic content of water by measuring the absorption by the amino acid Tyrosine of light radiation at 280 millimicra wave length.

A further object of this invention provides a method for determining the organic content of water by measuring the absorption by Tyrosine of light radiation at 280 millimicra wave length.

BRIEF DESCRIPTION OF THE INVENTION

After the breakdown of living organic matter in aquatic environments, both proteins and free amino acids are liberated. It has been found that Tyrosine has a sharp absorption peak at a wavelength of 280 millimicra. Through measuring the absorption by Tyrosine in an aqueous medium of light radiation at this wavelength, a determination of the concentration of Tyrosine in the medium is obtained. By relating this concentration to the amount of total proteinaceous matter, a measurement of the total organic content of water can be determined. Using this concept, an instrument is described which passes part of the aqueous medium continuously through a container and light radiation having a wavelength in the range of 280 millimicra is passed through the container and the aqueous medium. A photodetector measures the amount of transmitted light. The output of the photodetector is registered on a recorder which is precalibrated in values of dissolved organic matter per unit volume of aqueous medium.

The above described invention will hereinafter be more fully explained in connection with the accompanying figures in which:

FIG. 1 is a block diagram of the measuring system in accordance with this invention; and FIG. 2 is one embodiment of the total system for measurement in accordance with this invention.

DETAILED DESCRIPTION OF THE INVENTION

Figure 1:
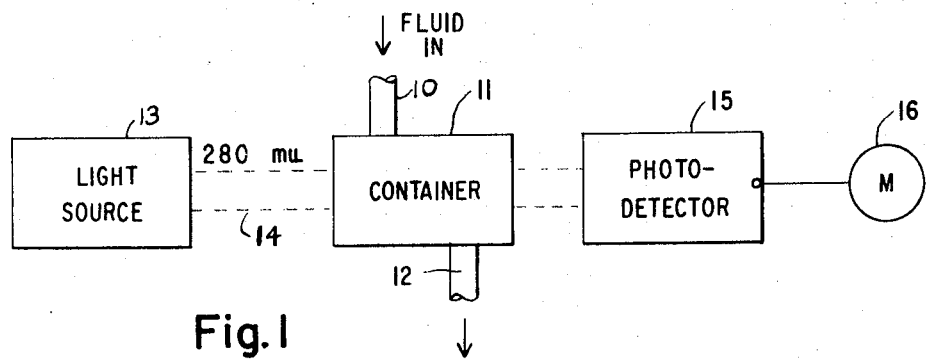

Referring to FIG. 1, there is shown a block diagram of the system used for carrying out the method of this invention. In the midst of any aqueous medium a shunt tube 10 is connected and passed through a measuring container 11 and then is discharged through output 12. The shunt path through the container 11 provides a continuous flow of liquid therethrough, thereby providing a continuous monitoring of the medium in the main source of supply. A light source 13 providing an output radiation in the range of 280 millimicra is passed through the container along path 14 and the amount of light which is transmitted through the container and fluid therein is measured by a photodetector 15. The electrical output from the photodetector 15 is measured on a meter 16.

It has been found that the amino acid Tyrosine has a sharp absorption peak at 280 millimicra. Tyrosine being an essential amino acid occurs as a building block of every kind of protein. Tyrosine has also been found in many polypeptides. Since the optical density at 280 millimicra of solutions containing Tyrosine is proportional to the concentration of Tyrosine in the aqueous solution, it is possible to calculate the concentration of Tyrosine by measuring the amount of light absorbed by the Tyrosine at this wavelength. The amount of light transmitted through a transmissive medium is proportional to the amount absorbed at 280 millimicra. The photodetector output will therefore be a function of the concentration of the Tyrosine in the aqueous solution. Since protein contains approximately 3.2 percent Tyrosine and protein constitutes 35 percent to 45 percent of all living matter, it is possible to calculate the total amount of proteinaceous matter in the aqueous solution and from that provide a value of the total dissolved organic matter in the solution. The meter 16 can be precalibrated to read directly in values of dissolved organic matter per unit volume of aqueous solution.

Figure 2:
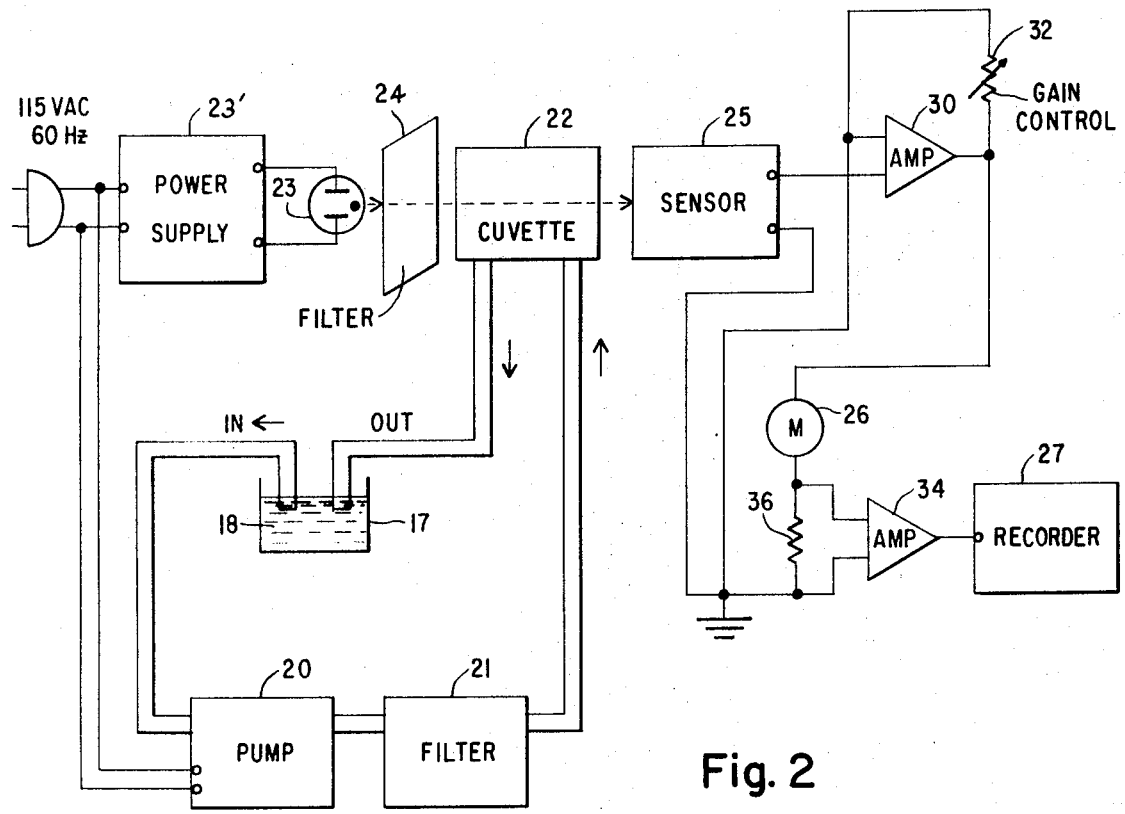

Referring to FIG. 2, there is shown a particular embodiment of an instrument which can be used for the system of FIG. 1. The body of water to be tested 18 is located within container 17. The water can be either stagnant or flowing. This body of water may, for example, be any treated or untreated effluent or may be any natural body of water whose level of organic content is to be tested. A shunt in the form of a flexible tube 19 is placed within the body of water 18. Pump 20 controls the flow of water passing through shunt tube 19 to deliver approximately 1 milliliter of water per second, through the tube. The discharge end of the pump 20 is connected to a filter system 21 composed of a coarse paper filter, and a 0.5 micron pore size filter, such as a Gilman glass. After the liquid is filtered, it enters a quartz flow through cuvette 22 which is placed within an ultra-violet spectrophotometer. The use of a quartz container is required for permitting the passage of UV radiation.

A mercury arc light source 23 is energized by means of power source 23'. Light source 23 supplies ultra-violet radiation for the system. Alternatively, the source may comprise an ozone lamp which is operated on rectified line current thereby having a single bright spot source of ultra-violet radiation. The lamp is necessarily fixed in a holder (not shown). Between the light source 23 and the cuvette 22, a narrow band width filter 24 is placed which will permit the passage of radiation only in the 280 millimicra wavelength range. Suitable filters are available from Jenaer Glaswerk Schott and Gens, Mainz, West Germany. The radiation at the particular wavelength passes through the cuvette and through the fluid contained therein.

The output radiation from the cuvette is detected by a photo multiplier cell 25 which is designed to detect radiation only in the 280 millimicra wavelength range. The output of the photocell 25 is read on meter 26 and the measurement can be registered on a chart recorder 27. The output of the photocell 25 is proportional to the transmittance of the fluid in the cuvette 22. Because of the particular wavelength which is used the Tyrosine in the fluid is the major source of absorption at this particular wavelength. Accordingly, the amount of current output from photocell 25 is proportional to the Tyrosine content of the water. Since the proportional amount of Tyrosine to the total organic matter is a fixed value, it is easily possible to convert the electrical output from the photocell 25 to give a direct reading of the dissolved organic matter in the aqueous medium. Suitable electronic circuitry as is known in the art can be appropriately designed to provide the electrical conversions. The recorder 27 can then be calibrated in units of milligrams of dissolved organic matter per liter of fluid. Since the instrument of FIG. 2 provides a continuous measurement of the fluid 18 to be tested, the recorder 27 will provide a continuous tracing of the quantity of organic matter in the water. The fluid from the cuvette 22 can be exhausted through line 28 as either waste output or can be fed back into the supply of aqueous medium 18.

Using the instrument of FIG. 2, the correlation between determining the total dissolved organic matter by using the Tyrosine concentration and by the techniques employed in the standard methods was found to be quite exact. The system as described can be successfully used for the continuous monitoring of dissolved organic matter of natural waters and of treated and untreated waste waters. In certain special cases, however, the readings obtained will not truly correlate with the total organic content of certain effluents. Waste water from paper mills may contain large quantities of particular organic matters which will upset the balance in the waste material measured. Similarly, sugar mills may discharge quantities of carbohydrates which disrupt the normal proportionality between the Tyrosine and the total organic matter. However, these particular unique cases would not affect the general usefulness of the system described for continuous monitoring of sewage plant effluents or the determination of organic content of natural waters.

As more specifically shown in FIG. 2, a power supply for the ultraviolet source of radiation, such as a Spectroline Model SCT-1, is energized by a source of energy, such as a 115 volt alternating current of 60 Hertz. The output of the power supply is used to energize a quartz ultraviolet lamp, such as a Spectroline Model 11SC-2, which radiates electromagnetic energy in the ultraviolet region of 2,800 Angstroms.

The ultraviolet radiation including the 2,800 A wavelength impinges on an interference filter with a narrow bandpass of 2,800 A. The interference filter allows only the 2,800 A wavelength through and blocks all other wavelengths from passing through the filter. The 2,800 A wavelength of ultraviolet passes through a quartz full-flow cuvette, such as a Scientific Glass Apparatus Model S4824.

A Tyrosine containing liquid is pumped through a microfilter, such as a Gilman glasspad, which filters out all the solid materials larger than a certain size, governed by the pore size of the filter. The remaining fluid and all the dissolved substances, including Tyrosine passes through the filter into the full-flow cuvette. The Tyrosine absorbs 2,800 A ultraviolet radiation in proportion to its concentration in he solvent. The remaining portion of the 2,800 A ultraviolet passes on through the cuvette unimpeded and falls on a special sensor which can detect this wavelength of ultraviolet such as a Clairex Model 7UV20-S. The resistance of this sensor varies in proportion to the amount of ultraviolet falling upon it. This sensor is connected to the input of an operational amplifier 30 which amplifies the current flowing through the sensor. A Gain Control 32, marked off in decades of, for example, 1, 10, 100 and 1000, allows a meter 'M' to read values of current directly related to the relative amounts of ultraviolet radiation falling upon the sensor. To allow the meter to read differing values of ultraviolet the Gain Control can be switched from, for example, a decade of 10 to a decade of 100, which is an increase in the reading on the meter with the decade of 10 to a reading on the meter times 100. The value of the meter reading is always multiplied by the reading on the gain control.

A recorder 27, such as a Hewlett-Packard Model 680 with its amplifier 34, as an option can be hooked up (or connected) to the recorder TERMINALS of the output resistor $R_L$ 36, such that the output of the operational amplifier can be permanently recorded on a paper strip recorder. Or a permanently installed recorder, such as a Rustrak Model 288, may be included with the basic instrument.

In many of the general applications the organic content of the natural waters and waste effluent is used as an indicator for establishing the degree of pollution, and efficiency of various methods of treatments. Accordingly, the system as herein described can be also used as a measure of the pollution level contained within bodies of water.

By narrow range filter is meant a filter passing frequencies ± 5 millimicra of the specified value.

While aqueous mediums have been discussed, other solvent systems including organic solvents may be monitored with this system.

What has heretofore been described is one embodiment of the invention of this instrument and other embodiments of the method of this invention will be obvious to those skilled in the art and the invention is not to be limited by the embodiment described.

What I claim as new and desire to secure by Letters Patent is:

1. A method of measuring the organic content of a solvent medium comprising the steps of:
   continuously passing a portion of the solvent medium through a transparent container;
   irridiating the solvent medium in said container with radiation having a wavelength of approximately 280 millimicrons;
   measuring the amount of said radiation absorbed by by the tyrosine present in the solvent medium in said container, said absorbance being proportional to the amount of tyrosine in the solvent, and
   converting said absorbance measurement into a value representative of the dissolved organic material in the solvent medium.

2. A method as in claim 1 further comprising the step of determining the pollutional level of the solvent medium from the value representing the dissolved organic material.

3. A method as in claim 1 wherein said converting comprises the steps of:
   relating the concentration of Tyrosine to the amount of total proteinaceous matter in said solvent medium; and
   calculating the amount of organic material from the amount of total proteinaceous matter.

4. A method as in claim 1 wherein said measuring includes the steps of detecting the transmittance of radiation through the solvent medium in said container and determining the absorbance from the detected transmittance.

5. An apparatus for measuring the organic content of a solvent medium by using spectrophotometric techniques, said apparatus comprising,
   a transparent container,
   means for continuously passing a sample of the solvent medium through the container,
   a source of light radiation of approximately 280 millimicrons wavelength,
   means for positioning said source to pass the radiation through the sample of solvent medium in said container,
   means for measuring the amount of said radiation absorbed by the tyrosine present in said solvent medium, the amount of said absorbance being proportional to the concentration of tyrosine in the solvent medium, and
   means for converting the measured amount of said absorbance into a value representing the amount of dissolved organic material in the solvent medium.

6. An apparatus as in claim 5 wherein said container is composed of quartz material.

7. An apparatus as in claim 5 wherein said source consists of an ultraviolet light source and a narrow band light filter passing radiation only of approximately 280 millimicron wavelength.

8. An apparatus as in claim 5 wherein said means for continuously passing the solvent medium consists of tube means connecting the solvent medium with the container, a pump connected along said tube, and aquatic filter means connected along said tube.

9. An apparatus as in claim 5 wherein said means for detecting consists of a photosensitive device producing an output current proportional to the amount of transmittance of light radiation through the sample solvent medium, and electronic means for converting the current output to the amount of absorbence.

10. An apparatus as in claim 5 wherein said means for measuring includes a recording chart.

11. An apparatus as in claim 10 wherein said recording chart is calibrated to read in values of weight of organic material per unit volume of solvent medium.

12. An apparatus as in claim 10 wherein said recording chart is calibrated to read in level of pollution of the solvent medium.

13. An apparatus as in claim 5 further including means to return the sample solvent medium from the container to the solvent medium being measured.

14. An apparatus as in claim 5 wherein said solvent medium is natural water.

15. An apparatus as in claim 5 wherein said solvent medium is waste effluent.

16. An apparatus as in claim 5 further comprising means for discharging the sample solvent medium from the container.

* * * * *